US012543915B2

(12) United States Patent
Yeom et al.

(10) Patent No.: US 12,543,915 B2
(45) Date of Patent: Feb. 10, 2026

(54) DISHWASHER AND WATER TANK FOR DISHWASHER

(71) Applicant: SAMSUNG ELECTRONICS CO., LTD., Suwon-si (KR)

(72) Inventors: Daeseon Yeom, Suwon-si (KR); Jusik Kim, Suwon-si (KR); Kitae Park, Suwon-si (KR); Junho Lee, Suwon-si (KR); Minho Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 18/325,272

(22) Filed: May 30, 2023

(65) Prior Publication Data
US 2023/0301484 A1    Sep. 28, 2023

Related U.S. Application Data

(63) Continuation of application No. PCT/KR2021/017857, filed on Nov. 30, 2021.

(30) Foreign Application Priority Data

Dec. 3, 2020 (KR) .................. 10-2020-0167778

(51) Int. Cl.
*A47L 15/42* (2006.01)
(52) U.S. Cl.
CPC ....... *A47L 15/4219* (2013.01); *A47L 15/4217* (2013.01)
(58) Field of Classification Search
CPC .................................................. A47L 15/4291
See application file for complete search history.

(56) References Cited

U.S. PATENT DOCUMENTS 7,815,746 B2   10/2010 Lee et al.
9,492,053 B2   11/2016 Shin et al.
(Continued)

FOREIGN PATENT DOCUMENTS

JP    H07067825 B2   5/2022
KR    10-0717471 B1  5/2007
(Continued)

OTHER PUBLICATIONS

International Search Report and Written Opinion of the International Searching Authority dated Mar. 3, 2022, in connection with International Application No. PCT/KR2021/017857, 8 pages.
(Continued)

*Primary Examiner* — Spencer E. Bell

(57) ABSTRACT

A dishwasher comprises a tub; a sump in which water supplied to the tub is accommodated; and a water tank disposed at one side of the tub. The water tank comprises a water storage part; a water supply channel that is connected to the sump and supplies water to the water storage part; an inlet which is provided at the top of the water storage part and through which water supplied via the water supply channel is introduced into the water storage part; an excessive supply water return channel which communicates at a first end thereof with the inlet and communicates at a second end thereof with the tub; and a floating cap which is provided under the inlet in the water storage part to selectively block the inlet according to the amount of water accommodated in the water storage part, wherein when the water storage is full of water, the floating cap blocks the inlet to disconnect the water storage part from the excessive supply water return channel.

16 Claims, 15 Drawing Sheets

(56) References Cited

U.S. PATENT DOCUMENTS

| | | |
|---|---|---|
| 9,861,259 B2 | 1/2018 | Jung et al. |
| 10,939,794 B2 | 3/2021 | Hahm et al. |
| 2007/0131261 A1 | 6/2007 | Lee et al. |
| 2011/0197934 A1 | 8/2011 | Fueglein et al. |
| 2013/0032181 A1 | 2/2013 | Shin et al. |
| 2015/0068056 A1 | 3/2015 | Jung et al. |
| 2018/0338667 A1 | 11/2018 | Hahm et al. |

FOREIGN PATENT DOCUMENTS

| | | |
|---|---|---|
| KR | 10-0717474 B1 | 5/2007 |
| KR | 10-0824377 B1 | 4/2008 |
| KR | 10-2013-0025263 A | 3/2013 |
| KR | 10-1247049 B1 | 4/2013 |
| KR | 10-1888418 B1 | 8/2018 |
| KR | 10-2018-0129287 A | 12/2018 |
| KR | 10-2025175 B1 | 9/2019 |

OTHER PUBLICATIONS

Notice of Allowance dated Nov. 24, 2025, in connection with Korean Application No. 10-2020-0167778, 7 pages.

DISHWASHER AND WATER TANK FOR DISHWASHER

This application is a Bypass Continuation of International Application No. PCT/KR2021/017857, filed Nov. 30, 2021, which claims priority to Korean Patent Application No. 10-2020-0167778, filed Dec. 3, 2020, the disclosures of which are herein incorporated by reference in their entirety.

BACKGROUND

1. Field

The disclosure relates to a dishwasher having a water tank.

2. Description of Related Art

A dishwasher is a device that automatically cleans food remnants from tableware such as dishes, bowls, cutlery, etc. using detergent and washing water.

In general, the dishwasher includes a tub in which dishes are accommodated, a sump disposed on the bottom of the tub to receive washing water, a dish basket retractably disposed in the tub, a spray assembly for spraying washing water, and a circulation pump for supplying washing water from the sump to the spray assembly.

When dishes are accommodated in the dish basket and the circulation pump operates, the washing water contained in the sump is supplied to the spray assembly, and the dishes are washed by the washing water sprayed from the spray assembly.

The process of washing dishes with the dishwasher includes a washing cycle for removing soil from the dishes and a rinsing cycle for rinsing the dishes from which soil is removed by the washing cycle. Generally, the dishwasher performs the rinsing cycle one or more times.

In general, the dishwasher may include a recycling water tank to reduce water consumption and energy consumption. The recycling water tank may be provided to store the rinsing water used in the last rinsing cycle so that it can be used for the next dish washing.

The recycling water tank according to the prior art is always in communication with the tub. Accordingly, the odor generated from the water stored in the recycling water tank may spread to the inside of the tub. Then, when the user opens the door of the dishwasher, the user may smell the water stored in the recycling water tank.

Because the water stored in the recycling water tank is the last rinsing water used in the final rinsing cycle of the dishes, the stored water may have the smell of soil on the dishes. In this case, when the user opens the door to use the dishwasher, the user may smell the odor of the rinsing water, that is, a bad smell, thereby feeling uncomfortable.

SUMMARY

The disclosure has been developed in order to overcome the above drawbacks and other problems associated with the conventional arrangement. An aspect of the disclosure provides a dishwasher and a water tank for a dishwasher capable of preventing or minimizing smell of water stored in the water tank from flowing into a tub by blocking communication between a water storage of the water tank and the tub when the water tank is full of water.

According to an aspect of the disclosure, a dishwasher may include a tub; a sump accommodating water supplied to the tub; and a water tank provided on one side of the tub, wherein the water tank may include a water storage; a water supply passage connected to the sump and configured to supply water to the water storage; an inlet provided at an upper end of the water storage and through which water supplied through the water supply passage flows into the water storage; an oversupplied water recovery passage including a first end communicating with the inlet and a second end communicating with the tub; and a floating cap provided below the inlet in the water storage and configured to selectively block the inlet according to an amount of water accommodated in the water storage, wherein when the water in the water storage is full, the floating cap may be configured to block the inlet to disconnect the oversupplied water recovery passage from the water storage.

The water tank may include a drain passage provided at a lower end of the water storage and connected to the sump, and when the water in the water storage is discharged to the sump through the drain passage, the floating cap may be configured to open the inlet to communicate the water storage and the oversupplied water recovery passage.

The dishwasher may further include a drain valve disposed in the drain passage and configured to selectively open and close the drain passage.

When the floating cap blocks the inlet, water supplied through the water supply passage may flow into the tub through the oversupplied water recovery passage.

The first end of the water supply passage may be located above the inlet, and an end of the oversupplied water recovery passage may be located between the inlet and the one end of the water supply passage.

The first end of the water supply passage may include a curved portion bent toward the inlet.

The water supply passage and the oversupplied water recovery passage may be formed side by side along a side surface and an upper surface of the water storage.

The floating cap may be configured to turn at a predetermined angle with respect to a rear surface of the water storage.

The floating cap may include a swing arm rotatably disposed on the rear surface of the water storage; and a sealing part provided at an end of the swing arm and formed to block the inlet.

The floating cap may be configured to linearly move in a vertical direction with respect to the inlet.

The floating cap may include guide grooves formed vertically on a front surface and a rear surface of the floating cap, the water storage may include guide ribs that are formed on the rear surface of the water storage, have a predetermined length, and may be configured to insert into the guide grooves. The floating cap may be configured to move linearly up and down along the guide ribs.

The water storage may include an accommodating wall provided on the rear surface of the water storage and surrounding the floating cap and the guide ribs, and the accommodating wall may include at least one through hole.

The water storage may include a pair of guide walls that are formed on the rear surface of the water storage to be spaced apart from each other by a predetermined distance and configured to guide a vertical movement of the floating cap, and a stopper may be provided at a lower end of each of the pair of guide walls to limit descent of the floating cap.

The dishwasher may further include a circulation pump configured to supply the water stored in the sump to the water tank; a main valve disposed between the circulation pump and the water tank, the main valve configured to selectively communicate the circulation pump and the water tank; a drain valve disposed at a lower end of the water storage and configured to selectively open and close the water storage; and a processor configured to control the circulation pump, the main valve, and the drain valve to supply the water from the sump to the water storage or to supply the water from the water storage to the sump.

The water tank may be a recycling water tank in which rinsing water accommodated in the sump from a previous cycle is stored.

According to another aspect of the disclosure, a water tank for a dishwasher may include a water storage; an inlet provided at an upper end of the water storage; an outlet provided at a lower end of the water storage; a water supply passage provided to supply water to the water storage through the inlet; an oversupplied water recovery passage including a first end communicated with the inlet and a second end communicated with an outside of the water tank; and a floating cap provided below the inlet in the water storage and formed to selectively block the inlet according to an amount of water accommodated in the water storage, wherein when the water storage is full of water, the floating cap may be configured to block the inlet to disconnect the water storage from the oversupplied water recovery passage, and the water supplied through the water supply passage may be discharged to the outside of the water tank through the oversupplied water recovery passage.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments described below are shown by way of example to assist understanding of the disclosure, and it should be understood that the disclosure may be variously modified and implemented differently from the embodiments described herein. However, in the following description of the disclosure, when it is determined that a detailed description of a related known function or components may unnecessarily obscure the gist of the disclosure, the detailed description and specific illustration thereof will be omitted. Further, in the accompanying drawings, the dimensions of some components may be arbitrarily exaggerated and not drawn to scale in order to aid understanding of the disclosure.

The terms 'first', 'second', etc. may be used to describe diverse components, but the components are not limited by the terms. The terms may only be used to distinguish one component from the others. For example, without departing from the scope of the disclosure, a first component may be referred to as a second component, and similarly, a second component may also be referred to as a first component.

The terms used in embodiments of the disclosure may be construed as commonly known to those skilled in the art unless otherwise defined.

Further, the terms 'leading end', 'rear end', 'upper side', 'lower side', 'top end', 'bottom end', etc. used in the disclosure are defined with reference to the drawings. However, the shape and position of each component are not limited by the terms.

Figure 1:
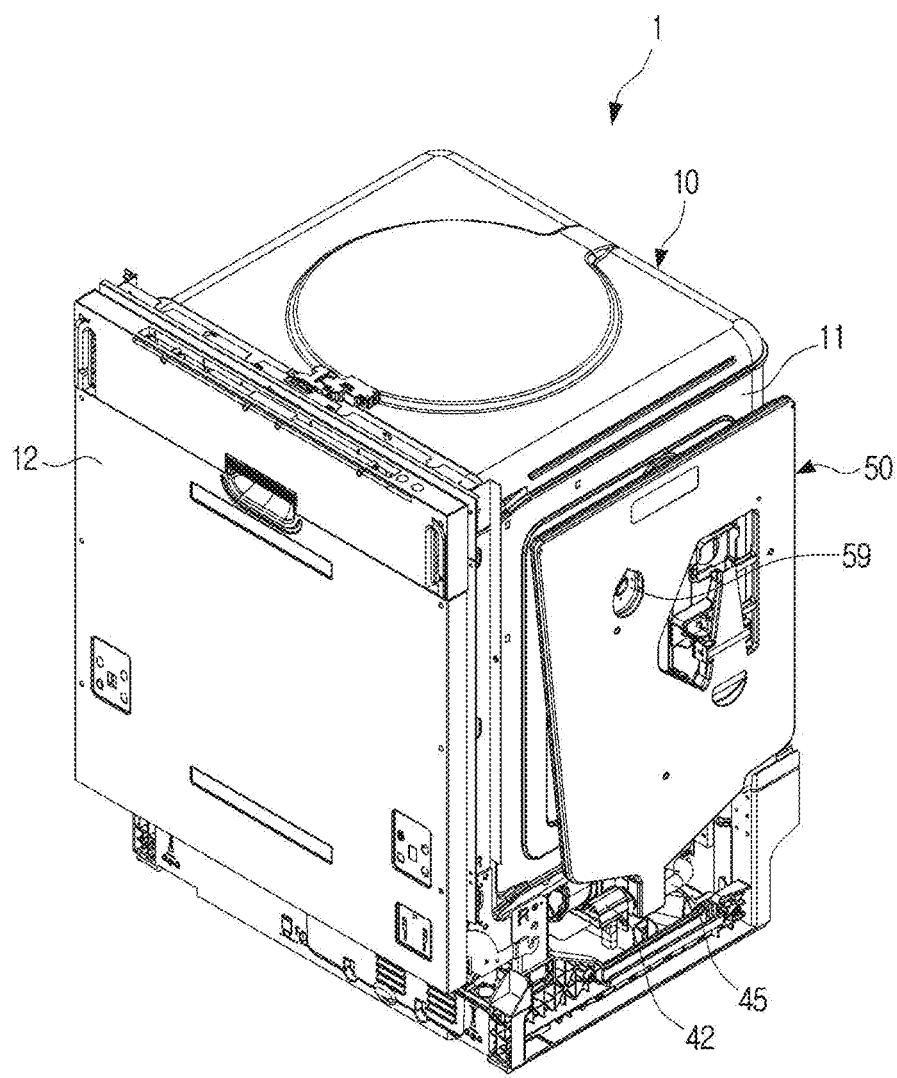
FIG. 1 is a perspective view illustrating a dishwasher according to an embodiment of the disclosure.
Figure 2:
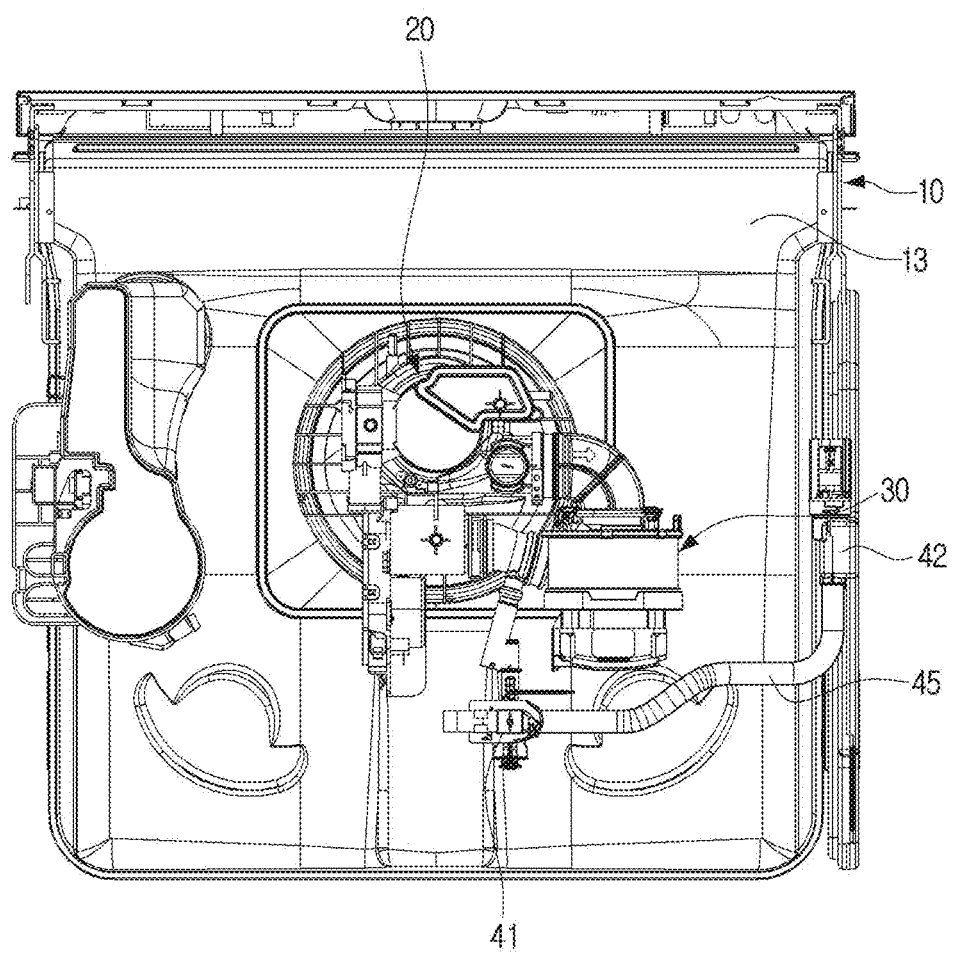
FIG. 2 is a bottom view illustrating a dishwasher according to an embodiment of the disclosure.
Figure 3:
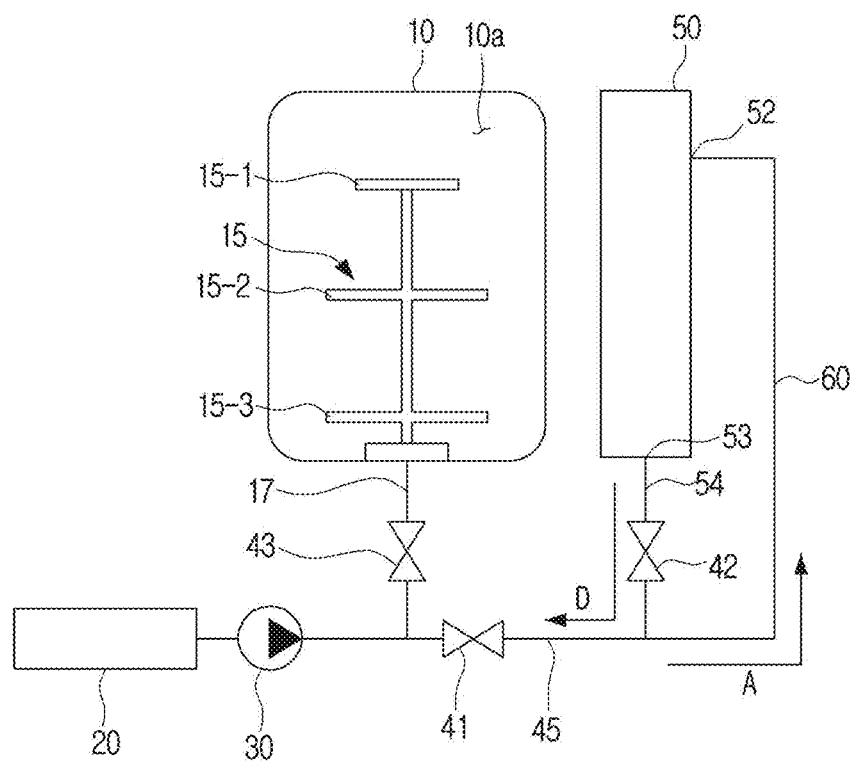
FIG. 3 is a view illustrating a flow of water in a dishwasher according to an embodiment of the disclosure.
Figure 4:
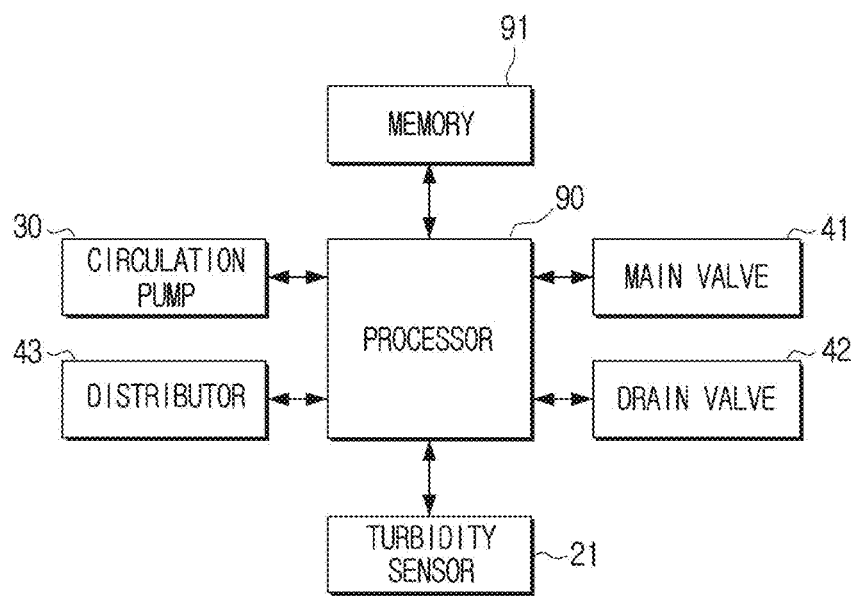
FIG. 4 is a functional block diagram of a dishwasher according to an embodiment of the disclosure.

FIG. 1 is a perspective view illustrating a dishwasher according to an embodiment of the disclosure. FIG. 2 is a bottom view illustrating a dishwasher according to an embodiment of the disclosure. FIG. 3 is a view illustrating a flow of water in a dishwasher according to an embodiment of the disclosure. FIG. 4 is a functional block diagram of a dishwasher according to an embodiment of the disclosure.

Referring to FIG. 1, a dishwasher 1 according to an embodiment of the disclosure may include a tub 10 and a water tank 50.

A washing space 10a for washing dishes is formed inside the tub 10. The front surface of the tub 10 is open, so that dishes may be put into the tub 10 or dishes may be taken out of the tub 10. A door 12 for opening and closing the front surface of the tub 10 is disposed on the front surface of the tub 10. The door 12 is hinged to the lower front surface of the tub 10 to open and close the front surface of the tub 10.

A dish basket for accommodating dishes may be accommodated inside the tub 10. In addition, a spray assembly 15 capable of washing dishes accommodated in the dish basket may be disposed inside the tub 10.

The spray assembly 15 may include an upper spray assembly 15-1 located at the upper portion of the washing space 10a of the tub 10, a middle spray assembly 15-2 located at the middle portion of the washing space 10a, and a lower spray assembly 15-3 located at the lower portion of the washing space 10a.

Figure 5:
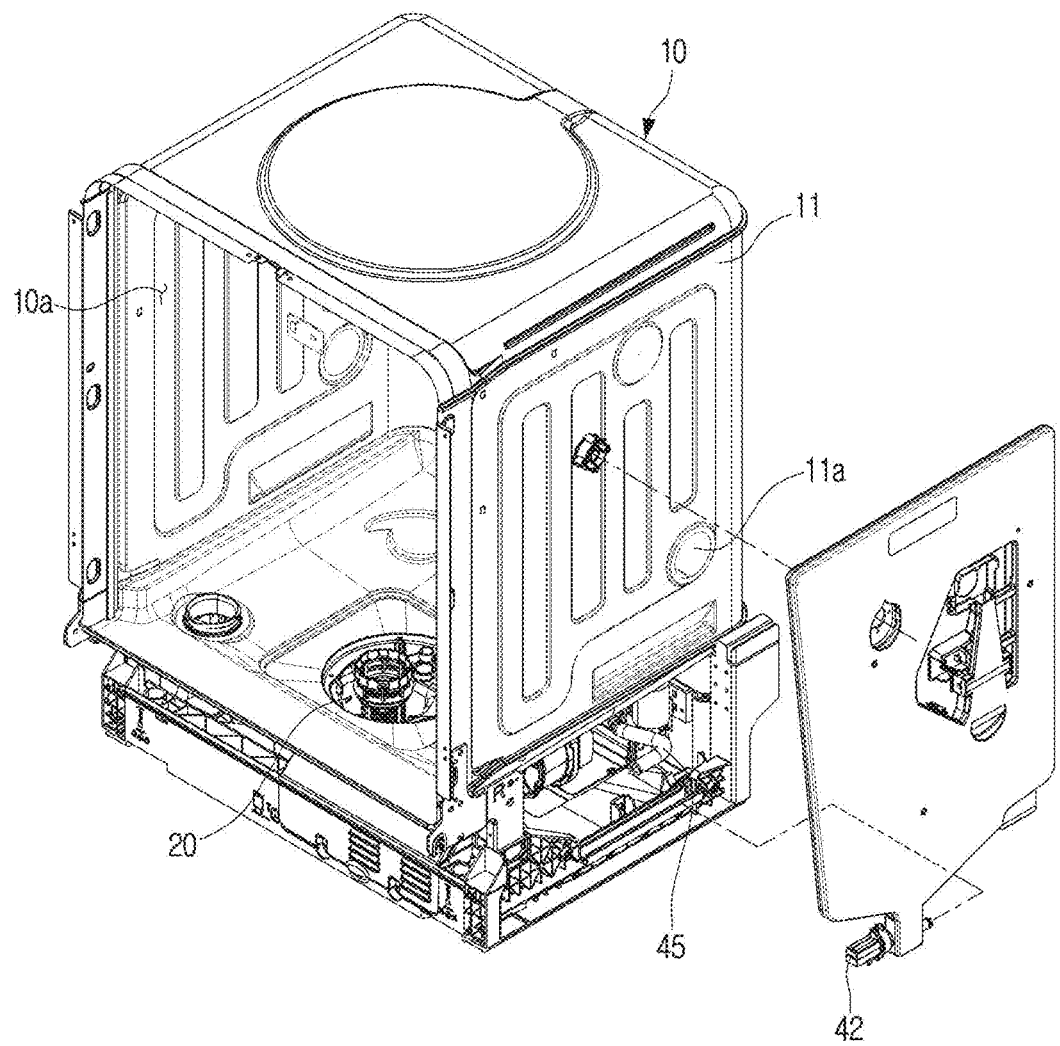
FIG. 5 is a perspective view illustrating a state in which a water tank is separated from a dishwasher according to an embodiment of the disclosure.

A sump 20 may be provided at the bottom of the tub 10 (see FIG. 5). The sump 20 is provided at the center of the bottom of the tub 10 and is formed to collect washing water, which can be referred to as water.

The sump 20 may include a turbidity sensor 21 for measuring the degree of contamination of the washing water. The processor 90 may measure the degree of contamination of the washing water using the turbidity sensor 21 and determine the number of times of performing the washing and rinsing cycles of the dishwasher 1 based on the degree of contamination of the washing water. That is, the processor 90 may increase the number of times of performing the washing or rinsing cycles when the degree of contamination of the washing water is high, and decrease the number of times of performing the washing or rinsing cycles when the degree of contamination of the washing water is low.

A circulation pump 30 may be provided on one side of the sump 20 to circulate the washing water collected in the sump 20.

The circulation pump 30 may supply the washing water collected in the sump 20 to the spray assembly 15 to wash dishes accommodated in the tub 10. The washing water sprayed by the spray assembly 15 is collected in the sump 20 and supplied again to the spray assembly 15 by the circulation pump 30 to wash dishes.

In addition, the circulation pump 30 may supply the washing water collected in the sump 20 to the water tank 50 to store the washing water in the water tank 50. The washing water stored in the water tank 50 may be supplied to the sump 20 and may be used for washing dishes.

As illustrated in FIG. 2, the circulation pump 30 may be disposed on the lower surface 13 of the tub 10. The circulation pump 30 may be driven by a motor.

As illustrated in FIG. 1, the water tank 50 is provided on one side surface 11 of the tub 10. Although the tub 10 and the water tank 50 are shown in an exposed state in FIG. 1, the tub 10 and the water tank 50 may be accommodated inside a case forming the appearance of the dishwasher 1.

The water tank 50 may be configured to store water accommodated in the sump 20 and to supply the stored water to the sump 20 when necessary. The water tank 50 may store washing water used in the last rinsing cycle, that is, water.

The washing water used in the last rinsing cycle stored in the water tank 50 may be used in a subsequent washing cycle. In other words, the water tank 50 stores the washing water used for previous dish washing so that the washing water may be reused for the next dish washing. Accordingly, the water tank 50 according to the disclosure may be referred to as a recycling water tank.

To this end, the water tank 50 may include an inlet 52 through which washing water is introduced and an outlet 53 through which stored water is discharged. The inlet 52 may be provided on the upper portion of the water tank 50, and the outlet 53 may be provided on the lower end of the water tank 50.

Referring to FIG. 3, the inlet 52 of the water tank 50 may be connected to a common passage 45 through a water supply passage 60. The outlet 53 of the water tank 50 may be connected to the common passage 45 through a drain passage 54.

The common passage 45 may be connected to the circulation pump 30, and a main valve 41 may be disposed in the common passage 45. The main valve 41 may be configured to allow selective communication between the circulation pump 30 and the water tank 50. In other words, the main valve 41 may be configured to open or block the common passage 45.

Therefore, when the main valve 41 is opened, the washing water may flow through the common passage 45, and when the main valve 41 is closed, the washing water may not flow through the common passage 45.

A drain valve 42 may be disposed in the drain passage 54. The drain valve 42 may be configured to selectively communicate the water tank 50 and the common passage 45. In other words, the drain valve 42 may be configured to open or block the drain passage 54.

Therefore, when the drain valve 42 is opened, the water tank 50 and the common passage 45 communicate with each other, so that water in the water tank 50 may flow to the common passage 45 through the drain passage 54 (arrow D). Because the drain passage 54 is provided at the lower end of the water tank 50, water in the water tank 50 is supplied to the common passage 45 by gravity.

At this time, when the main valve 41 disposed in the common passage 45 is opened, water in the water tank 50 may be supplied to the sump 20 through the common passage 45 and the main valve 41. In other words, when the drain valve 42 and the main valve 41 are opened, water in the water tank 50 may flow to the sump 20 along the drain passage 54 and the common passage 45.

Additionally, the spray assembly 15 may be connected to the circulation pump 30 through a washing passage 17. Accordingly, when the circulation pump 30 operates, the washing water in the sump 20 may be supplied to the spray assembly 15 through the washing passage 17.

A distributor 43 may be disposed in the washing passage 17. The distributor 43 may be configured to selectively communicate the circulation pump 30 with one of the upper spray assembly 15-1, the middle spray assembly 15-2, and the lower spray assembly 15-3. Accordingly, the washing water supplied from the sump 20 by the circulation pump 30 may be sprayed into the tub 10 through one of the upper spray assembly 15-1, the middle spray assembly 15-2, and the lower spray assembly 15-3.

In the case that the washing water in the sump 20 is supplied to the spray assembly 15 through the washing passage 17 when the main valve 41 disposed in the common passage 45 is closed and the circulation pump 30 operates, the washing water may not be supplied to the water tank 50.

In case of supplying the washing water to the water tank 50, the main valve 41 is opened. In this case, when the circulation pump 30 operates, the washing water in the sump 20 may be supplied to the water tank 50 through the common passage 45 and the water supply passage 60 (arrow A).

The processor 90 may be configured to control the dishwasher 1 to wash dishes accommodated in the tub 10.

Referring to FIG. 4, the dishwasher 1 may include the processor 90, the circulation pump 30, the distributor 43, the main valve 41, and the drain valve 42.

The processor 90 may be configured to control the circulation pump 30, the distributor 43, the main valve 41, and the drain valve 42.

For example, when washing dishes accommodated in the tub 10, the processor 90 blocks the main valve 41. Then, when the processor 90 operates the circulation pump 30, the washing water in the sump 20 is supplied to the spray assembly 15 through the washing passage 17 and the distributor 43 to wash the dishes.

When storing the washing water accommodated in the sump 20 in the water tank 50, the processor 90 opens the main valve 41. Then, when the processor 90 operates the circulation pump 30, the washing water in the sump 20 may pass through the main valve 41, and may be supplied to the water tank 50 through the common passage 45 and the water supply passage 60.

When supplying the washing water stored in the water tank 50 to the sump 20, the processor 90 opens the drain valve 42 and the main valve 41. Then, the washing water stored in the water tank 50 is supplied to the sump 20 by gravity. In other words, the washing water stored in the water tank 50 may be discharged through the outlet 53 at the bottom of the water tank 50, may flow into the common passage 45 through the drain passage 54, and may be supplied to the sump 20 through the common passage 45 and the main valve 41.

The processor 90 may include at least one of a central processing unit (CPU), a micro controller unit (MCU), a micro processing unit (MPU), a controller, an application processor (AP), a graphic processing unit (GPU), a communication processor (CP), and an ARM processor, or may be defined in the corresponding term.

In addition, the processor 90 may be implemented as a system on chip (SoC) having a built-in processing algorithm, a large scale integration (LSI), or a field programmable gate array (FPGA).

In addition, the processor 90 may perform various functions by executing computer executable instructions stored in the memory 91.

The memory 91 may store programs for processing or control of the processor 90 and various data for the operation of the dishwasher 1. For example, the memory 91 may store a plurality of application programs for operating the dishwasher 1 and data and commands for operating the dishwasher 1.

In the above description, the processor 90 has performed functions of supplying water to the water tank 50 and draining water from the water tank 50. However, the processor 90 is not limited thereto. The processor 90 may perform the same or similar function as the dishwasher according to the prior art.

The circulation pump 30 is configured to circulate the washing water in the sump 20. The circulation pump 30 may be controlled by the processor 90. When the circulation pump 30 operates, the washing water in the sump 20 may be supplied to the spray assembly 15 and the water tank 50.

The distributor 43 may be disposed in the washing passage 17 and may be operated by the processor 90. The processor 90 may control the distributor 43 to supply the washing water in the sump 20 to one of the upper spray assembly 15-1, the middle spray assembly 15-2, and the lower spray assembly 15-3.

The main valve 41 may be disposed in the common passage 45 and may be opened and closed by the processor 90. When the main valve 41 is opened, the washing water may flow through the common passage 45. In detail, when the main valve 41 is opened while the drain valve 42 is closed, the washing water in the sump 20 may be supplied to the water tank 50. When the main valve 41 is closed, the washing water in the sump 20 may not be supplied to the water tank 50.

As illustrated in FIG. 2, the main valve 41 and the common passage 45 may be disposed on one side of the circulation pump 30 on the lower surface of the tub 10. The common passage 45 may be formed of a pipe or hose.

The drain valve 42 may be disposed in the drain passage 54 and may be opened and closed by the processor 90. When the drain valve 42 is opened, the washing water stored in the water tank 50 may be supplied to the sump 20 through the drain passage 54 and the common passage 45.

When the washing water in the water tank 50 is supplied to the sump 20, the main valve 41 in the common passage 45 is opened. In the case where the main valve 41 is closed, when the drain valve 42 is opened, the washing water in the water tank 50 is not supplied to the sump 20.

Hereinafter, the water tank 50 used in the dishwasher 1 according to an embodiment of the disclosure will be described in detail with reference to FIGS. 5 to 8.

Figure 6:
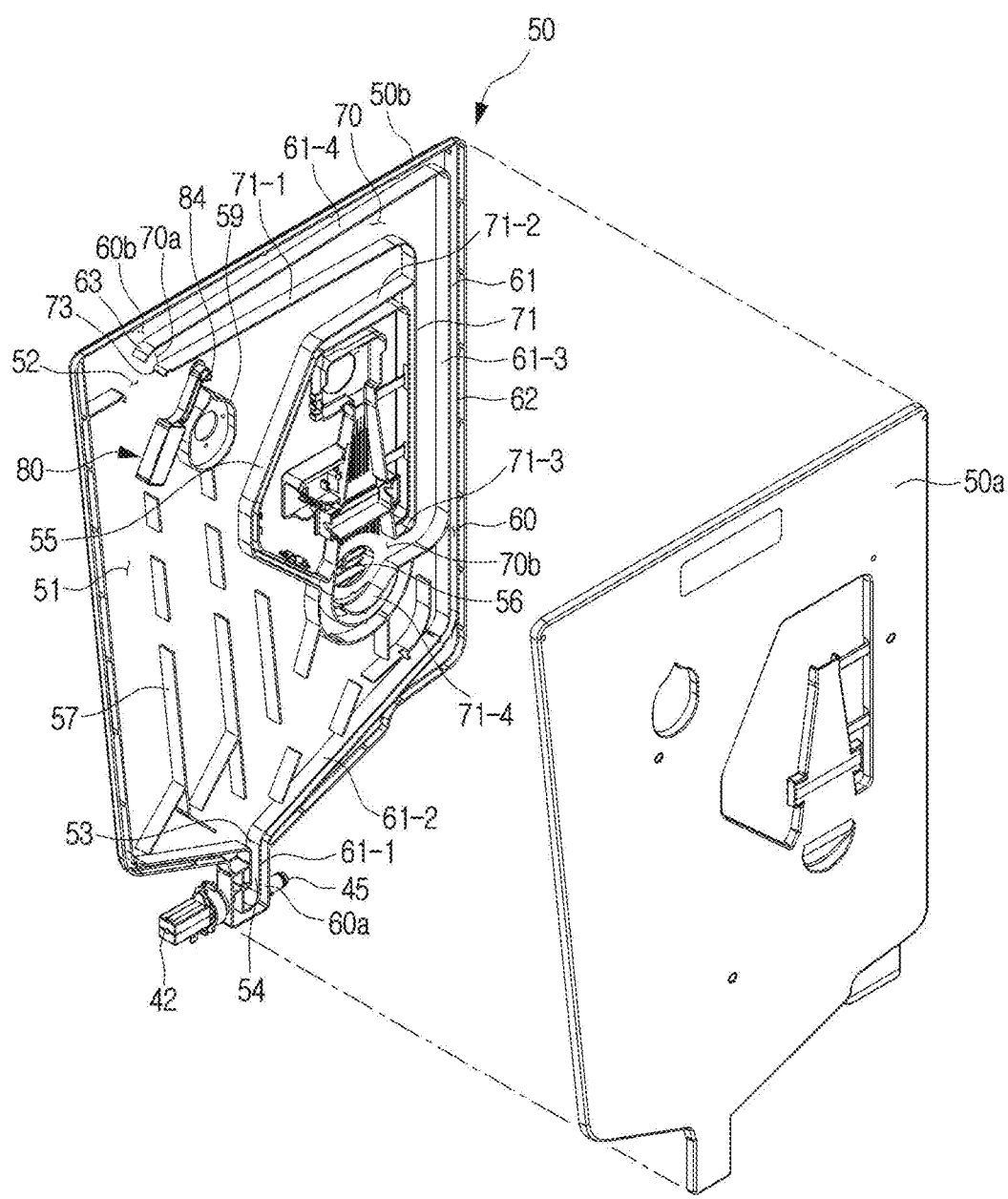
FIG. 6 is an exploded perspective view illustrating a water tank according to an embodiment of the disclosure.
Figure 7:
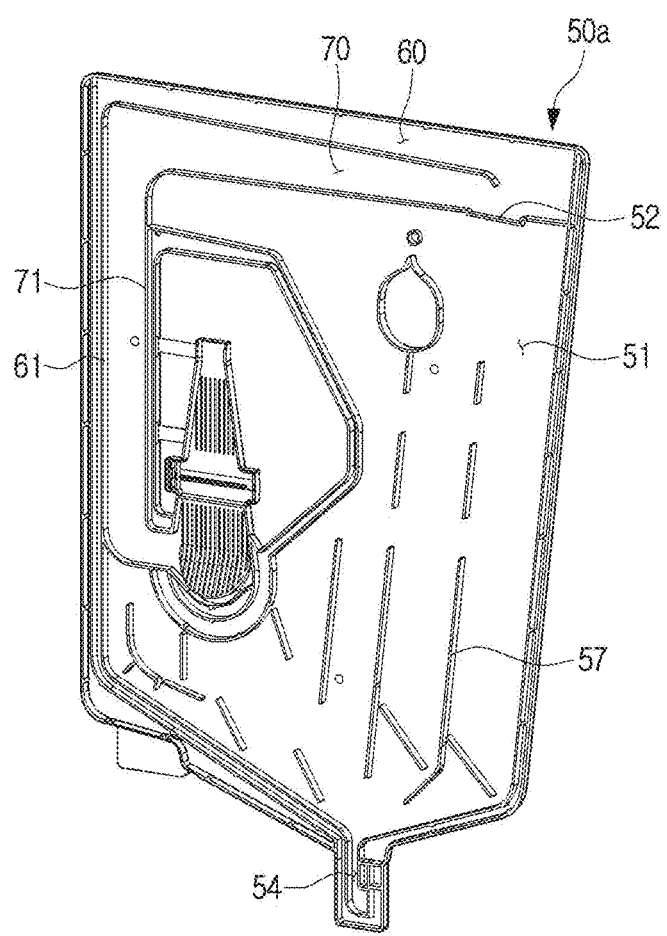
FIG. 7 is a view illustrating a rear surface of an upper water tank panel of a water tank according to an embodiment of the disclosure.
Figure 8:
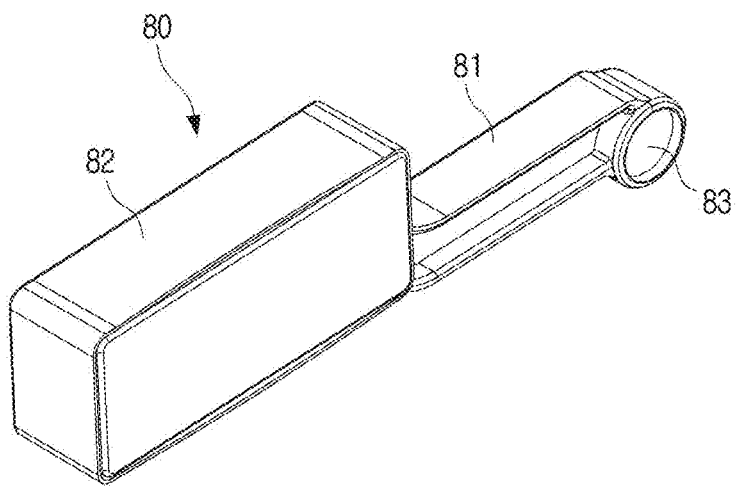
FIG. 8 is a perspective view illustrating a floating cap of a water tank according to an embodiment of the disclosure.

FIG. 5 is a perspective view illustrating a state in which a water tank is separated from a dishwasher according to an embodiment of the disclosure. FIG. 6 is an exploded perspective view illustrating a water tank according to an embodiment of the disclosure. FIG. 7 is a view illustrating a rear surface of an upper water tank panel of a water tank according to an embodiment of the disclosure. FIG. 8 is a perspective view illustrating a floating cap of a water tank according to an embodiment of the disclosure.

Referring to FIGS. 5 and 6, the water tank 50 may be detachably disposed on one side surface 11 of the tub 10. An opening 11a connected to the water tank 50 may be provided on the side surface of the tub 10.

The drain valve 42 may be disposed at the lower end of the water tank 50. When the drain valve 42 is opened, the washing water stored in the water tank 50 may be discharged.

The water tank 50 may include a water storage 51, a water supply passage 60, an oversupplied water recovery passage 70, and a floating cap 80. In other words, the water storage 51, the water supply passage 60, and the oversupplied water recovery passage 70 may be formed inside the water tank 50.

The water storage 51 is formed to store a predetermined amount of washing water. The inlet 52 into which the washing water supplied by the circulation pump 30 flows is provided at the upper end of the water storage 51. The outlet 53 and the drain passage 54 through which the washing water stored in the water storage 51 is discharged are provided at the lower end of the water storage 51.

The water storage 51 may be partitioned from the water supply passage 60 and the oversupplied water recovery passage 70 by a partition wall 55. The partition wall 55 may be formed to protrude from the rear surface of the water tank 50.

A plurality of reinforcing ribs 57 may be disposed inside the water storage 51. The plurality of reinforcing ribs 57 may be formed to protrude from the rear surface of the water tank 50.

The drain passage 54 may be formed to extend a predetermined length from the lower end of the water storage 51. The drain valve 42 is disposed in the drain passage 54. Accordingly, when the drain valve 42 is opened, the washing water stored in the water storage 51 may be discharged to the outside through the drain passage 54. When the drain valve 42 is closed, the washing water in the water storage 51 may not be discharged to the outside.

The water supply passage 60 may be provided on one side of the water tank 50. In detail, the water supply passage 60 may be formed along the side surface of the water storage 51 inside the water tank 50 to supply the washing water to the inlet 52 provided at the upper end of the water storage 51. An entrance 60a of the water supply passage 60 may be provided adjacent to the drain passage 54 at the lower end of the water tank 50. An exit 60b of the water supply passage 60 may be provided above the inlet 52 of the water storage 51.

Thus, the washing water discharged from the exit 60b of the water supply passage 60 may flow into the inlet 52 of the water storage 51. An end of the water supply passage 60, that is, the exit 60b of the water supply passage 60 may include a curved portion 63 bent toward the inlet 52 so that the washing water discharged from the water supply passage 60 may smoothly flow into the inlet 52 of the water storage 51.

For example, the water supply passage 60 may include a first water supply passage provided adjacent to the drain passage 54, a second water supply passage connected to the first water supply passage and provided adjacent to the bottom surface of the water tank 50, a third water supply passage connected to the second water supply passage and provided adjacent to the side surface of the water tank 50, and a fourth water supply passage connected to the third water supply passage and provided adjacent to the upper surface of the water tank 50.

The entrance 60a of the water supply passage 60, that is, the entrance of the first water supply passage is connected to the common passage 45. An end of the fourth water supply passage, that is, the exit 60b of the water supply passage 60 is located above the inlet 52 of the water storage 51 so that washing water discharged from the fourth water supply passage may flow into the inlet 52. The curved portion 63 bent toward the inlet 52 of the water storage 51 may be provided at the end of the fourth water supply passage.

Therefore, the washing water introduced through the common passage 45 flows along the water supply passage 60 and is stored in the water storage 51 through the inlet 52.

The oversupplied water recovery passage 70 may be provided between the water supply passage 60 and the water storage 51. The oversupplied water recovery passage 70 may be formed parallel to the water supply passage 60 along the upper surface and one side surface of the water storage 51 below the water supply passage 60.

In detail, the oversupplied water recovery passage 70 may be formed to connect an upper side of the inlet 52 of the water storage 51 and a recovery hole 56 provided in the middle of the water tank 50. An end of the oversupplied water recovery passage 70 may be located between the inlet 52 of the water storage 51 and the end of the water supply passage 60. In other words, an entrance 70a of the oversupplied water recovery passage 70 may be provided adjacent to the exit 60b of the water supply passage 60 above the inlet 52 of the water storage 51, and an exit 70b of the oversupplied water recovery passage 70 may be connected to the recovery hole 56 of the water tank 50.

For example, the oversupplied water recovery passage 70 may include a first recovery passage provided between the fourth water supply passage of the water supply passage 60 and the upper surface of the water storage 51, a second recovery passage connected to the first recovery passage and provided between the third water supply passage and the side surface of the water storage 51, and a third recovery passage connecting the second recovery passage and the recovery hole 56.

The recovery hole 56 may be provided on the rear surface of the water tank 50 to correspond to the opening 11a formed in the side surface 11 of the tub 10. Thus, washing water discharged through the recovery hole 56 may flow into the tub 10.

Accordingly, the end of the oversupplied water recovery passage 70 may communicate with the inlet 52 of the water storage 51, and the other end thereof may communicate with the tub 10. Therefore, when the inlet 52 of the water storage 51 is blocked, the washing water supplied through the water supply passage 60 may flow along the oversupplied water recovery passage 70, and may be discharged to the tub 10 through the recovery hole 56.

The width of the oversupplied water recovery passage 70 may be wider than that of the water supply passage 60. The cross-sectional area of the oversupplied water recovery passage 70 may be formed sufficiently wide to prevent a phenomenon that the overflowing washing water flows backward or does not enter the sump 20 due to air pressure (negative pressure) inside the tub 10.

As illustrated in FIG. 6, the water supply passage 60 may be formed as a channel provided inside the water tank 50. In detail, the water supply passage 60 may be formed by the side surface of the water tank 50 and a water supply wall 61. The water supply wall 61 is formed to protrude from the rear surface of the water tank 50 and is spaced apart from the side surface of the water tank 50 by a predetermined distance.

The water supply wall 61 may include a first water supply wall 61-1 provided adjacent to the drain passage 54, a second water supply wall 61-2 extending from one end of the first water supply wall 61-1 and provided adjacent to the lower surface of the water tank 50, a third water supply wall 61-3 extending from one end of the second water supply wall 61-2 and provided adjacent to the side surface of the water tank 50, and a fourth water supply wall 61-4 extending from one end of the third water supply wall 61-3 and provided adjacent to the upper surface of the water tank 50.

The fourth water supply wall 61-4 may extend above the water storage 51 to a position facing the inlet 52 of the water storage 51. In detail, the fourth water supply wall 61-4 may be formed such that one end of the fourth water supply wall 61-4 is located approximately at the center of the inlet 52 of the water storage 51 and the washing water discharged along the fourth water supply wall 61-4 may flow into the inlet 52. In other words, one end of the fourth water supply wall 61-4 may be formed as the curved portion 63 bent toward the inlet 52 of the water storage 51.

The first water supply wall 61-1 may form the lower portion of the partition wall 55 of the water storage 51.

A sub water supply wall 62 may be provided between the water supply wall 61 and the lower and side surfaces of the water tank 50. Then, the water supply wall 61 and the sub water supply wall 62 may form the water supply passage 60. The sub water supply wall 62 may be disposed when the inner lower surface and the inner side surface of the water tank 50 are not smooth or when the width of the water supply passage 60 is to be adjusted. However, this is only an example, and the sub water supply wall 62 may not be provided between the water supply wall 61 and the lower and side surfaces of the water tank 50.

Referring to FIG. 6, the oversupplied water recovery passage 70 may be formed of a recovery wall 71 and the water supply wall 61. The recovery wall 71 is disposed to protrude from the rear surface of the water tank 50 and is spaced apart from the water supply wall 61 by a predetermined distance.

The recovery wall 71 may include a first recovery wall 71-1 provided at a predetermined distance from the fourth water supply wall 61-4, a second recovery wall 71-2 extending from one end of the first recovery wall 71-1 and provided parallel to the third water supply wall 61-3, a third recovery wall 71-3 extending from one end of the second recovery wall 71-2 to an upper side of the recovery hole 56, and a fourth recovery wall 71-4 provided at a lower side of the recovery hole 56 and connecting one end of the third recovery wall 71-3 and the third water supply wall 61-3.

One end of the first recovery wall 71-1 may form one side surface of the inlet 52 of the water storage 51, and may be formed so as not to protrude toward the other side surface of the inlet 52 than one end of the water supply wall 61. In other words, the first recovery wall 71-1 may be formed so that the one end 73 of the first recovery wall 71-1 does not cross a virtual vertical line when the virtual vertical line is drawn from one end of the water supply wall 61 to a plane forming the inlet 52. In the case of forming the one end 73 of the first recovery wall 71-1 as described above, when the washing water flows into the inlet 52 of the water storage 51 through the water supply passage 60, the flow of washing water into the oversupplied water recovery passage 70 may be prevented or minimized.

The first recovery wall 71-1 may form the upper portion of the partition wall 55 of the water storage 51.

In addition, referring to FIG. 6, the water tank 50 may include an upper water tank panel 50a and a lower water tank panel 50b. When the upper water tank panel 50a and the lower water tank panel 50b are integrally connected, the water tank 50 may be formed. The upper water tank panel 50a and the lower water tank panel 50b may be joined by adhesive, ultrasonic welding, or the like.

The partition wall 55 forming the water storage 51, the water supply wall 61 forming the water supply passage 60, the recovery wall 71 forming the oversupplied water recovery passage 70, and the plurality of reinforcing ribs 57 may be formed on the inner surface of the rear surface of the lower water tank panel 50b and the inner surface of the front surface of the upper water tank panel 50a.

For example, the lower part of the partition wall 55, the lower part of the water supply wall 61, the lower part of the recovery wall 71, and the lower parts of the plurality of reinforcing ribs 57 may be formed on the inner surface of the rear surface of the lower water tank panel 50b. As illustrated in FIG. 7, the upper part of the partition wall 55, the upper part of the water supply wall 61, the upper part of the recovery wall 71, and the upper parts of the plurality of reinforcing ribs 57 corresponding to the lower part of the partition wall 55, the lower part of the water supply wall 61, the lower part of the recovery wall 71, and the lower parts of the plurality of reinforcing ribs 57 formed on the inner surface of the rear surface of the lower water tank panel 50b may be formed on the inner surface of the front surface of the upper water tank panel 50a.

When the lower water tank panel 50b and the upper water tank panel 50a are connected, the lower part of the partition wall 55, the lower part of the water supply wall 61, the lower part of the recovery wall 71, and the lower parts of the plurality of reinforcing ribs 57 of the lower water tank panel 50b are respectively connected with the upper part of the partition wall 55, the upper part of the water supply wall 61, the upper part of the recovery wall 71, and the upper parts of the plurality of reinforcing ribs 57 of the upper water tank panel 50a, thereby forming the partition wall 55, the water supply wall 61, the recovery wall 71, and the plurality of reinforcing ribs 57.

The floating cap 80 is provided below the inlet 52 in the water storage 51, and may be formed to selectively block the inlet 52 depending on the amount of washing water accommodated in the water storage 51.

For example, when the water storage 51 is full of washing water, the floating cap 80 blocks the inlet 52 to prevent the washing water supplied through the water supply passage 60 from flowing into the water storage 51. When the floating cap 80 blocks the inlet 52 of the water storage 51, the water supply passage 60 and the oversupplied water recovery passage 70 communicate with each other. Therefore, the washing water flowing into the water supply passage 60 is discharged to the recovery hole 56 through the oversupplied water recovery passage 70.

In addition, when the floating cap 80 blocks the inlet 52 of the water storage 51, the water storage 51 is disconnected from the oversupplied water recovery passage 70. Accordingly, the smell of the washing water or foreign substances stored in the water storage 51 may be prevented from flowing into the tub 10 through the oversupplied water recovery passage 70 and the recovery hole 56.

In the case where the inlet 52 of the water storage 51 is blocked by the floating cap 80 as in the disclosure, when the user opens the door 12 to use the dishwasher 1, the smell caused by the washing water stored in the water tank 50 may be prevented or minimized from being smelled by the user.

The floating cap 80 for blocking the inlet 52 of the water storage 51 may be formed in various structures.

In the case of the water tank 50 shown in FIG. 6, the floating cap 80 is formed in a structure capable of swinging at a predetermined angle with respect to the rear surface of the water tank 50.

Referring to FIGS. 6 and 8, the floating cap 80 according to an embodiment of the disclosure may include a swing arm 81 and a sealing part 82.

The swing arm 81 may be rotatably disposed on the rear surface of the water storage 51. A shaft hole 83 is provided at one end of the swing arm 81, and a fixed shaft 84 may be inserted into the shaft hole 83. Both ends of the fixed shaft 84 may be fixed to the front and rear surfaces of the water storage 51. Therefore, the swing arm 81 may rotate at a certain angle around the fixed shaft 84.

The sealing part 82 is provided at the other end of the swing arm 81, and is formed to block the inlet 52 of the water storage 51. In this embodiment, because the inlet 52 is formed in a rectangular cross-section, the sealing part 82 may be formed in a rectangular parallelepiped shape to block the rectangular inlet 52. The upper surface of the sealing part 82 may be formed to seal the inlet 52 of the water storage 51. Therefore, when the upper surface of the sealing part 82 contacts the lower surface of the inlet 52 to block the inlet 52, the washing water discharged from the water supply passage 60 does not flow into the water storage 51.

The sealing part 82 may be formed to float by the washing water accommodated in the water storage 51. In other words, the sealing part 82 may be formed of a material that floats on water.

Accordingly, when the washing water is filled in the water storage 51, the floating cap 80 may be rotated in the clockwise direction around the fixed shaft 84 and raised by the washing water.

When the washing water is discharged from the water storage 51, the floating cap 80 may descend by rotating in the counter-clockwise direction around the fixed shaft 84. A stopper for limiting the downward movement of the floating cap 80 may be disposed in the water storage 51. Therefore, when there is little or no washing water in the water storage 51, the floating cap 80 may be inclinedly supported by the stopper.

In the case of the embodiment shown in FIG. 6, a fixing part 59 for fixing the water tank 50 to one side surface 11 of the tub 10 is provided to function as the stopper. Therefore, when there is no water in the water storage 51, the floating cap 80 rotates downward about the fixed shaft 84 and is supported inclinedly by the fixing part 59.

When the washing water is supplied while the floating cap 80 is supported by the fixing part 59, the floating cap 80 may be rotated at a predetermined angle around the fixed shaft 84 by the washing water, thereby blocking the inlet 52 of the water storage 51.

In other words, the floating cap 80 may be disposed on the rear surface of the water storage 51 so as to swing at a certain angle, and may block or open the inlet 52 of the water storage 51 according to the amount of washing water supplied to the water storage 51.

Hereinafter, an operation of the dishwasher 1 according to an embodiment of the disclosure will be described in detail with reference to FIGS. 9 to 11.

Figure 9:
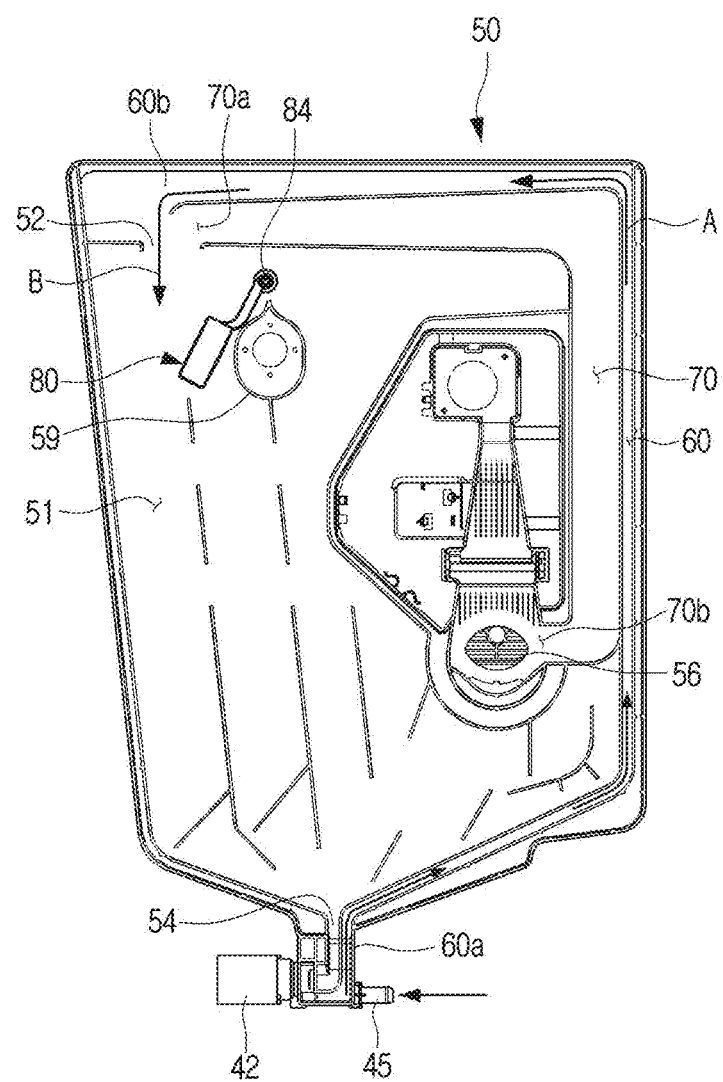
FIG. 9 is a view illustrating a case where water is supplied to a water tank according to an embodiment of the disclosure.

FIG. 9 is a view illustrating a case where water is supplied to a water tank according to an embodiment of the disclosure.

Before the washing water is supplied to the water tank 50, the inlet 52 of the water storage 51 is open. In detail, the floating cap 80 is spaced apart from the inlet 52 of the water storage 51 and inclinedly supported by the fixing part 59. Therefore, the water storage 51 is in communication with the water supply passage 60 and the oversupplied water recovery passage 70.

In this state, when washing water is supplied through the water supply passage 60, the water storage 51 may be filled with the washing water. In other words, when the washing water in the sump 20 is introduced into the entrance 60*a* of the water supply passage 60 by the circulation pump 30, the washing water moves along the water supply passage 60 and is discharged through the exit 60*b* of the water supply passage 60 (arrow A). At this time, because the exit 60*b* of the water supply passage 60 is located approximately at the center of the inlet 52 of the water storage 51, the washing water discharged from the water supply passage 60 is introduced into the inlet 52 of the water storage 51 (arrow B) and does not flow into the oversupplied water recovery passage 70.

In detail, when the processor 90 opens the main valve 41 and operates the circulation pump 30, the washing water accommodated in the sump 20 flows into the common passage 45 through the main valve 41.

The washing water introduced into the common passage 45 flows into the entrance 60*a* of the water supply passage 60. At this time, because the drain valve 42 is closed, the washing water introduced into the common passage 45 does not flow into the drain passage 54.

The washing water introduced into the entrance 60*a* of the water supply passage 60 moves along the water supply passage 60 to the exit 60*b* of the water supply passage 60 (arrow A). Because the exit 60*b* of the water supply passage 60 is located above the inlet 52 of the water storage 51 and one end thereof is curved toward the inlet 52, the washing water discharged from the exit 60*b* of the water supply passage 60 flows into the inlet 52 of the water storage 51 along the curved portion 63.

At this time, because the curved portion 63 of the water supply passage 60 extends further to the left than one end of the oversupplied water recovery passage 70 and is curved toward the inlet 52 of the water storage 51, the washing water discharged from the water supply passage 60 may mostly be introduced into the inlet 52 of the water storage 51, and may hardly be introduced into the oversupplied water recovery passage 70.

Figure 10:
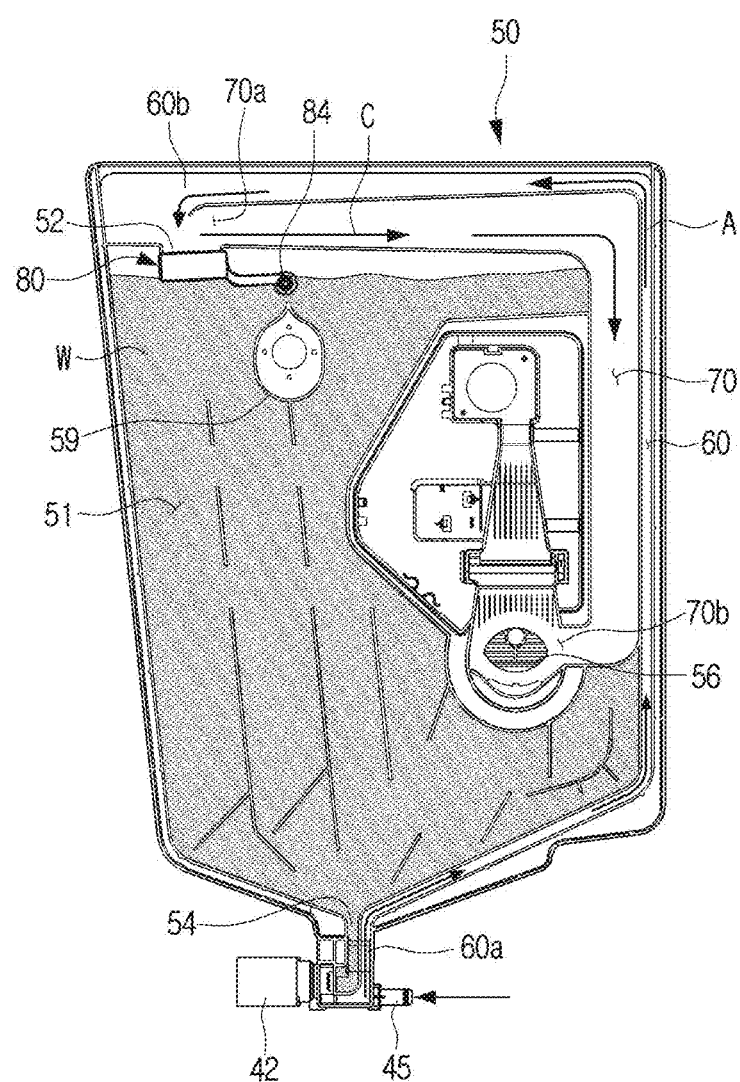
FIG. 10 is a view illustrating a case where water reaches a full water level in a water tank according to an embodiment of the disclosure.

When the washing water W is continuously supplied through the water supply passage 60 and the washing water W is full in the water storage 51, as illustrated in FIG. 10, the floating cap 80 blocks the inlet 52 of the water storage 51.

FIG. 10 is a view illustrating a case where water reaches a full water level in a water tank according to an embodiment of the disclosure.

As illustrated in FIG. 10, when the inlet 52 of the water storage 51 is blocked by the floating cap 80, the washing water discharged from the exit 60*b* of the water supply passage 60 does not flow into the inlet 52 of the water storage 51, but flows into the oversupplied water recovery passage 70 (arrow C).

In other words, when the floating cap 80 blocks the inlet 52 of the water storage 51 by the washing water, the exit 60*b* of the water supply passage 60 and the entrance 70*a* of the oversupplied water recovery passage 70 are connected with each other, so that the washing water supplied through the water supply passage 60 flows through the oversupplied water recovery passage 70. Because the exit 70*b* of the oversupplied water recovery passage 70 is connected to the recovery hole 56, the washing water supplied through the water supply passage 60 is discharged into the tub 10 through the recovery hole 56.

In other words, when the amount of washing water supplied to the water storage 51 reaches a designed storage amount, the floating cap 80 blocks the inlet 52 of the water storage 51, so that the water storage 51 is closed. When the water storage 51 is closed, the water storage 51 is disconnected from the water supply passage 60 and the oversupplied water recovery passage 70, and the water supply passage 60 and the oversupplied water recovery passage 70 are connected to each other. Accordingly, washing water oversupplied while the circulation pump 30 is operating is discharged into the tub 10 through the oversupplied water recovery passage 70 and is returned to the sump 20.

As described above, when the inlet 52 of the water storage 51 is blocked by the floating cap 80, the water storage 51 and the oversupplied water recovery passage 70 are disconnected from each other. Accordingly, it is possible to prevent or minimize the smell of the washing water stored in the water storage 51 from being introduced into the tub 10 through the oversupplied water recovery passage 70 and the recovery hole 56.

When using the washing water stored in the water storage 51, the drain valve 42 provided in the drain passage 54 is opened. Then, the washing water in the water storage 51 is discharged through the drain passage 54.

Figure 11:
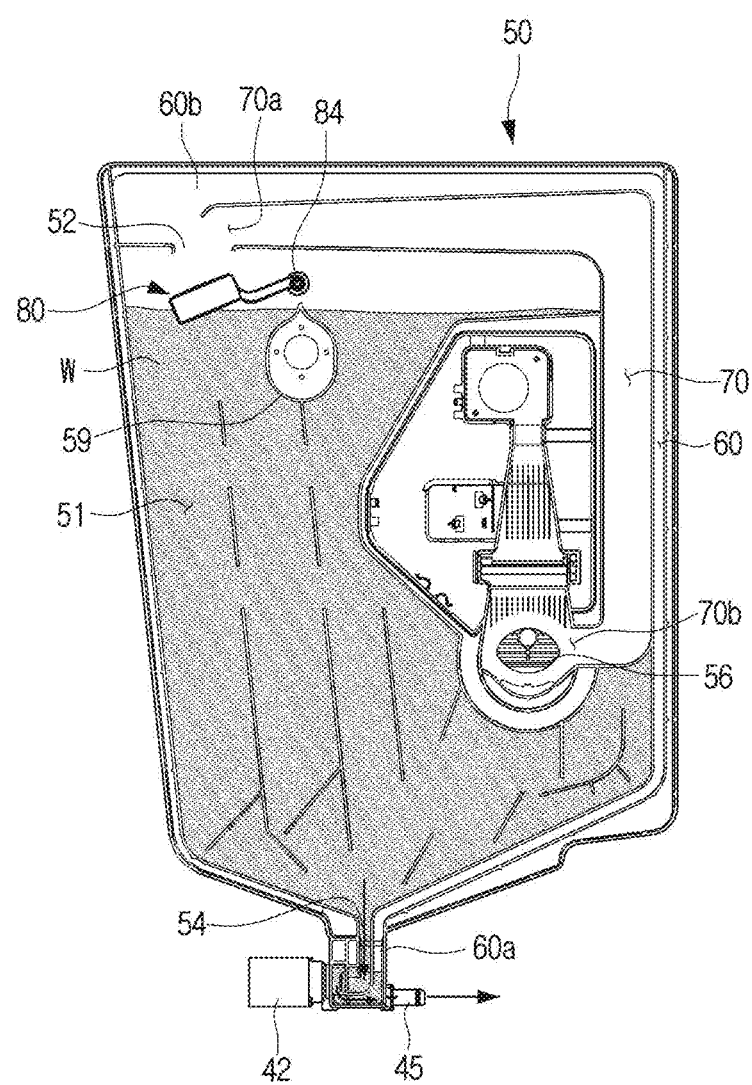
FIG. 11 is a view illustrating a case where water is discharged from a water tank according to an embodiment of the disclosure.

FIG. 11 is a view illustrating a case where washing water is discharged from a water tank according to an embodiment of the disclosure.

As illustrated in FIG. 11, when the drain valve 42 provided in the drain passage 54 is opened, the washing water stored in the water storage 51 is discharged through the drain passage 54 and flows into the common passage 45 (arrow D). At this time, the washing water in the water storage 51 may be introduced into the common passage 45 by gravity.

The washing water flowing into the common passage 45 may pass through the main valve 41 and be supplied to the sump 20 (see FIG. 3). Accordingly, when the processor 90 opens the drain valve 42, the main valve 41 is also opened so that the water in the water storage 51 is supplied to the sump 20 through the main valve 41.

When the washing water in the water storage 51 is discharged, as illustrated in FIG. 11, the floating cap 80 rotates downward about the fixed shaft 84 to open the inlet 52 of the water storage 51.

When more than a predetermined amount of washing water is discharged, the floating cap 80 is inclinedly supported by the fixing part 59.

In the above, the case where the floating cap 80 is disposed to rotate at a predetermined angle in the water storage 51 has been described. However, the structure of the floating cap 80 is not limited thereto. As another example, the floating cap 80 may be formed in a structure in which the floating cap 80 vertically moves up and down.

Hereinafter, a floating cap 800 according to another example will be described in detail with reference to FIGS. 12 and 13.

Figure 12:
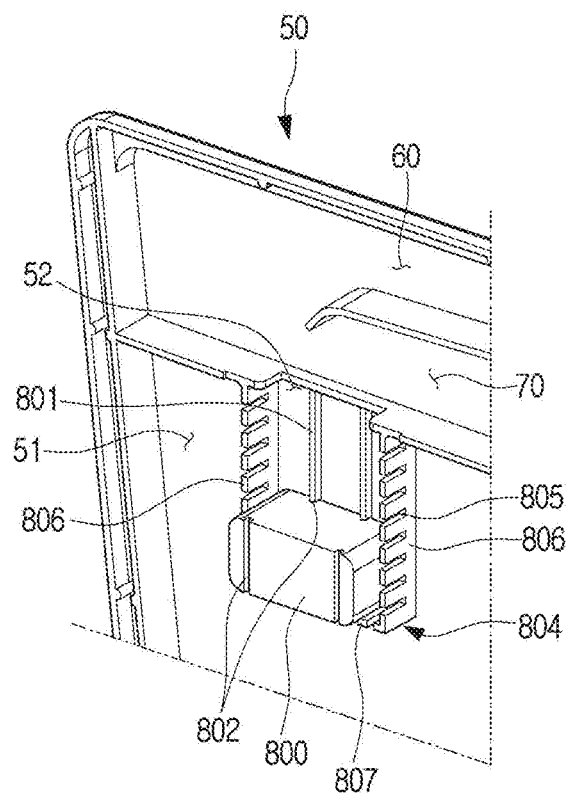
FIG. 12 is a partial perspective view illustrating another example of a floating cap used in a water tank according to an embodiment of the disclosure.

FIG. 12 is a partial perspective view illustrating another example of a floating cap used in a water tank according to an embodiment of the disclosure. FIG. 13 is a partial view illustrating a case where water reaches a full level in a water tank using the floating cap of FIG. 12.

Referring to FIG. 12, the floating cap 800 according to this embodiment may be disposed to linearly move in a vertical direction with respect to the inlet 52 of the water storage 51.

To this end, a pair of guide ribs 801 are provided on the rear surface of the water storage 51. The pair of guide ribs 801 are formed to have a predetermined length to limit the moving distance of the floating cap 800.

A pair of guide grooves 802 may be vertically formed on the front and rear surfaces of the floating cap 800. The pair of guide grooves 802 may be formed in a shape corresponding to the pair of guide ribs 801 provided on the water storage 51.

When the pair of guide ribs 801 provided on the rear surface of the water storage 51 are inserted into the pair of guide grooves 802 of the floating cap 800, the floating cap 800 may move linearly up and down along the pair of guide ribs 801.

An accommodating wall 804 surrounding the floating cap 800 and the pair of guide ribs 801 may be provided on the rear surface of the water storage 51. At least one through hole 805 may be formed in the accommodating wall 804. Therefore, washing water flowing into the inlet 52 of the water storage 51 may flow into the water storage 51 through the plurality of through holes 805.

The accommodating wall 804 may include two side walls 806 and a bottom wall 807. The bottom wall 807 is disposed to connect the lower ends of the two side walls 806 and limits the descent of the floating cap 800.

A pair of guide ribs may be formed on the front surface of the water storage 51 that can be inserted into the pair of guide grooves 802 provided on the front surface of the floating cap 800.

Therefore, when there is no washing water in the water storage 51, as illustrated in FIG. 12, the floating cap 800 is located on the bottom wall 807 of the accommodating wall 804, so that the inlet 52 of the water storage 51 is opened. Therefore, when the circulation pump 30 operates and the washing water is supplied through the water supply passage 60, the washing water may be introduced into the water storage 51 through the inlet 52 and the at least one through hole 805.

Figure 13:
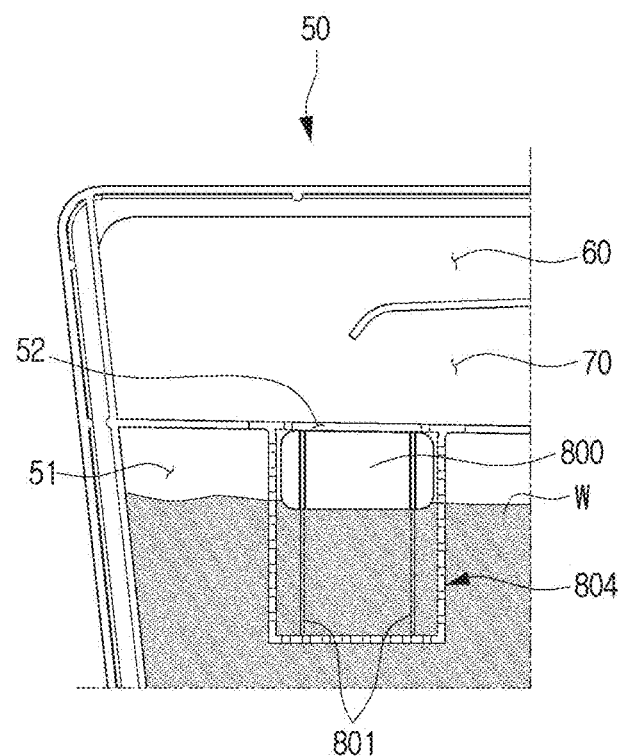
FIG. 13 is a partial view illustrating a case where water reaches a full water level in a water tank using the floating cap of FIG. 12.

When the amount of the washing water supplied to the water storage 51 reaches the designed storage amount, as illustrated in FIG. 13, the floating cap 800 is moved upward by the washing water W, thereby blocking the inlet 52 of the water storage 51.

When the inlet 52 of the water storage 51 is blocked by the floating cap 800, the water storage 51 is disconnected from the water supply passage 60 and the oversupplied water recovery passage 70, and the water supply passage 60 is connected to the oversupplied water recovery passage 70. Thus, the washing water supplied through the water supply passage 60 is recovered into the tub 10 through the oversupplied water recovery passage 70.

In the above, the case where the pair of guide ribs 801 are provided on the water storage 51 and the pair of guide grooves 802 are provided on the front and rear surfaces of the floating cap 800 has been described. However, the structures of the guide ribs 801 and the guide grooves 802 are not limited thereto.

As another example, one guide rib 801 may be formed on each of the front and rear surfaces of the water storage 51, and one guide groove 802 corresponding to the guide rib 801 may be formed on each of the front and rear surfaces of the floating cap 800.

Hereinafter, a floating cap according to another example will be described in detail with reference to FIGS. 14 and 15.

Figure 14:
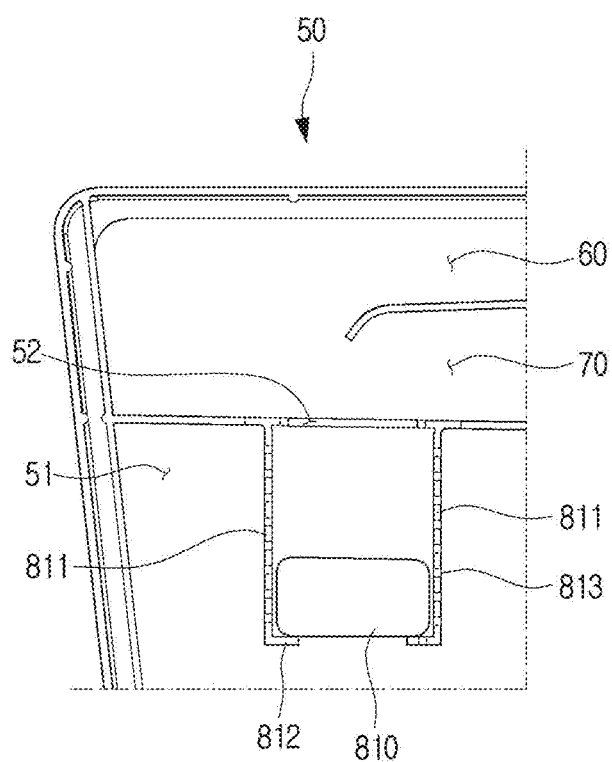
FIG. 14 is a partial view illustrating another example of a floating cap used in a water tank according to an embodiment of the disclosure.

FIG. 14 is a partial view illustrating another example of a floating cap used in a water tank according to an embodiment of the disclosure. FIG. 15 is a partial view illustrating a case where water reaches a full level in a water tank using the floating cap of FIG. 14.

Referring to FIG. 14, the floating cap 810 according to this embodiment is disposed to move linearly in a vertical direction with respect to the inlet 52 of the water storage 51.

To this end, a pair of guide walls 811 are provided on the rear surface of the water storage 51. The pair of guide walls 811 are disposed on the rear surface of the water storage 51 to be spaced apart from each other by a predetermined distance, and are formed to guide the vertical movement of the floating cap 810.

A stopper 812 for limiting the descent of the floating cap 810 may be provided at a lower end of each of the pair of guide walls 811.

The floating cap 810 may be formed in a rectangular parallelepiped, and both side surfaces of the floating cap 810 may be formed to be guided by the pair of guide walls 811. Accordingly, the floating cap 810 may slide up and down along the pair of guide walls 811.

At least one through hole 813 may be formed in the pair of guide walls 811. Therefore, washing water flowing into the inlet 52 of the water storage 51 may flow into the water storage 51 through the at least one through hole 813.

Therefore, when there is no washing water in the water storage 51, as illustrated in FIG. 14, the floating cap 810 is located on the stoppers 812 provided at the lower ends of the pair of guide walls 811, so that the inlet 52 of the water storage 51 is opened. Therefore, when the circulation pump 30 operates and the washing water is supplied through the water supply passage 60, the washing water may be introduced into the water storage 51 through the inlet 52 and the at least one through hole 813.

Figure 15:
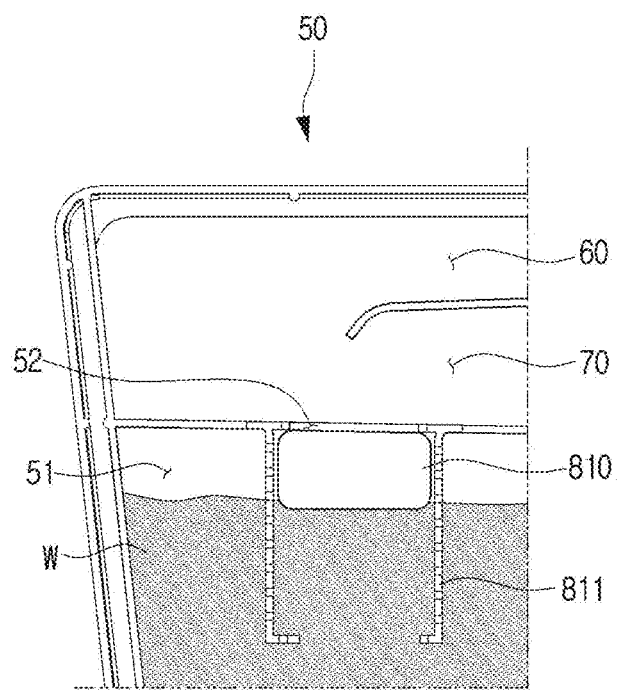
FIG. 15 is a partial view illustrating a case where water reaches a full water level in a water tank using the floating cap of FIG. 14.

When the amount of the washing water W supplied to the water storage 51 reaches the designed storage amount, as illustrated in FIG. 15, the floating cap 810 is moved upward along the pair of guide walls 811 by the washing water W, thereby blocking the inlet 52 of the water storage 51.

When the inlet 52 of the water storage 51 is blocked by the floating cap 810, the water storage 51 is disconnected from the water supply passage 60 and the oversupplied water recovery passage 70, and the water supply passage 60 is connected to the oversupplied water recovery passage 70. Thus, the washing water supplied through the water supply passage 60 is recovered into the tub 10 through the oversupplied water recovery passage 70.

As described above, with the dishwasher 1 according to an embodiment of the disclosure, when the water tank 50 is filled with washing water to a full water level, the floating cap 80, 800, and 810 blocks the inlet 52 of the water storage 51. Therefore, the water storage 51 and the oversupplied water recovery passage 70, which are normally communicated with each other, are disconnected from each other by the floating cap 80, 800, and 810, so that it is possible to prevent or minimize the smell of washing water stored in the water storage 51 from being introduced into the tub 10 through the oversupplied water recovery passage 70.

Therefore, with the dishwasher 1 according to an embodiment of the disclosure, when the user opens the door 12 to use the dishwasher 1, the odor caused by the washing water stored in the water tank 50 may be prevented or minimized from being smelled by the user.

The disclosure has been described above in an exemplary manner. The terms used herein are for the purpose of description and should not be construed in a limiting sense. Various modifications and variations of the disclosure are possible according to the above contents. Accordingly, unless otherwise stated, the disclosure may be practiced freely within the scope of the claims.

Although the present disclosure has been described with various embodiments, various changes and modifications may be suggested to one skilled in the art. It is intended that the present disclosure encompass such changes and modifications as fall within the scope of the appended claims.

What is claimed is:

1. A dishwasher comprising:
   a tub;
   a sump configured to accommodate water supplied to the tub; and
   a water tank provided on one side of the tub,
   wherein the water tank comprises:
      a water storage;
      a water supply passage connected to the sump and configured to supply water to the water storage;
      an inlet provided at an upper end of the water storage and through which water supplied through the water supply passage flows into the water storage;
      an oversupplied water recovery passage including a first end communicating with the inlet and a second end communicating with the tub; and
      a floating cap provided below the inlet in the water storage and configured to selectively block the inlet according to an amount of water accommodated in the water storage,
   wherein when the water in the water storage is full, the floating cap is configured to block the inlet to disconnect the oversupplied water recovery passage from the water storage.

2. The dishwasher of claim 1, wherein:
   the water tank further comprises a drain passage provided at a lower end of the water storage and connected to the sump, and
   when the water in the water storage is discharged to the sump through the drain passage, the floating cap is configured to open the inlet to communicate the water storage and the oversupplied water recovery passage.

3. The dishwasher of claim 2, further comprising:
   a drain valve disposed in the drain passage and configured to selectively open and close the drain passage.

4. The dishwasher of claim 1, wherein, when the floating cap blocks the inlet, water supplied through the water supply passage flows into the tub through the oversupplied water recovery passage.

5. The dishwasher of claim 1, wherein:
   one end of the water supply passage is located above the inlet, and
   the first end of the oversupplied water recovery passage is located between the inlet and the one end of the water supply passage.

6. The dishwasher of claim 5, wherein the one end of the water supply passage includes a curved portion bent toward the inlet.

7. The dishwasher of claim 5, wherein the water supply passage and the oversupplied water recovery passage are formed side by side along a side surface and an upper surface of the water storage.

8. The dishwasher of claim 1, wherein the floating cap is configured to turn at a predetermined angle with respect to a rear surface of the water storage.

9. The dishwasher of claim 8, wherein the floating cap comprises:
   a swing arm rotatably disposed on the rear surface of the water storage; and a sealing part provided at an end of the swing arm and formed to block the inlet.

10. The dishwasher of claim 1, wherein the floating cap is configured to linearly move in a vertical direction with respect to the inlet.

11. The dishwasher of claim 10, wherein:
the floating cap includes guide grooves formed vertically on a front surface and a rear surface of the floating cap,
the water storage includes guide ribs that are formed on the rear surface of the water storage, have a predetermined length, and are configured to insert into the guide grooves, and
the floating cap is configured to move linearly up and down along the guide ribs.

12. The dishwasher of claim 11, wherein:
the water storage includes an accommodating wall provided on the rear surface of the water storage and surrounding the floating cap and the guide ribs, and
the accommodating wall includes at least one through hole.

13. The dishwasher of claim 10, wherein:
the water storage includes a pair of guide walls that are formed on a rear surface of the water storage to be spaced apart from each other by a predetermined distance and configured to guide a vertical movement of the floating cap, and
a stopper is provided at a lower end of each of the pair of guide walls to limit descent of the floating cap.

14. The dishwasher of claim 1, further comprising:
a circulation pump configured to supply the water stored in the sump to the water tank;
a main valve disposed between the circulation pump and the water tank, the main valve configured to selectively communicate the circulation pump and the water tank;
a drain valve disposed at a lower end of the water storage and configured to selectively open and close the water storage; and
a processor configured to control the circulation pump, the main valve, and the drain valve to supply the water from the sump to the water storage or to supply the water from the water storage to the sump.

15. The dishwasher of claim 1, wherein the water tank is a recycling tank in which rinsing water accommodated in the sump from a previous cycle is stored.

16. A water tank for a dishwasher comprising:
a water storage;
an inlet provided at an upper end of the water storage;
an outlet provided at a lower end of the water storage;
a water supply passage provided to supply water to the water storage through the inlet;
an oversupplied water recovery passage including a first end communicated with the inlet and a second end communicated with an outside of the water tank; and
a floating cap provided below the inlet in the water storage and configured to selectively block the inlet according to an amount of water accommodated in the water storage,
wherein when the water storage is full of water, the floating cap blocks the inlet to disconnect the water storage from the oversupplied water recovery passage, and the water supplied through the water supply passage is discharged to the outside of the water tank through the oversupplied water recovery passage.

* * * * *